Figure 1:
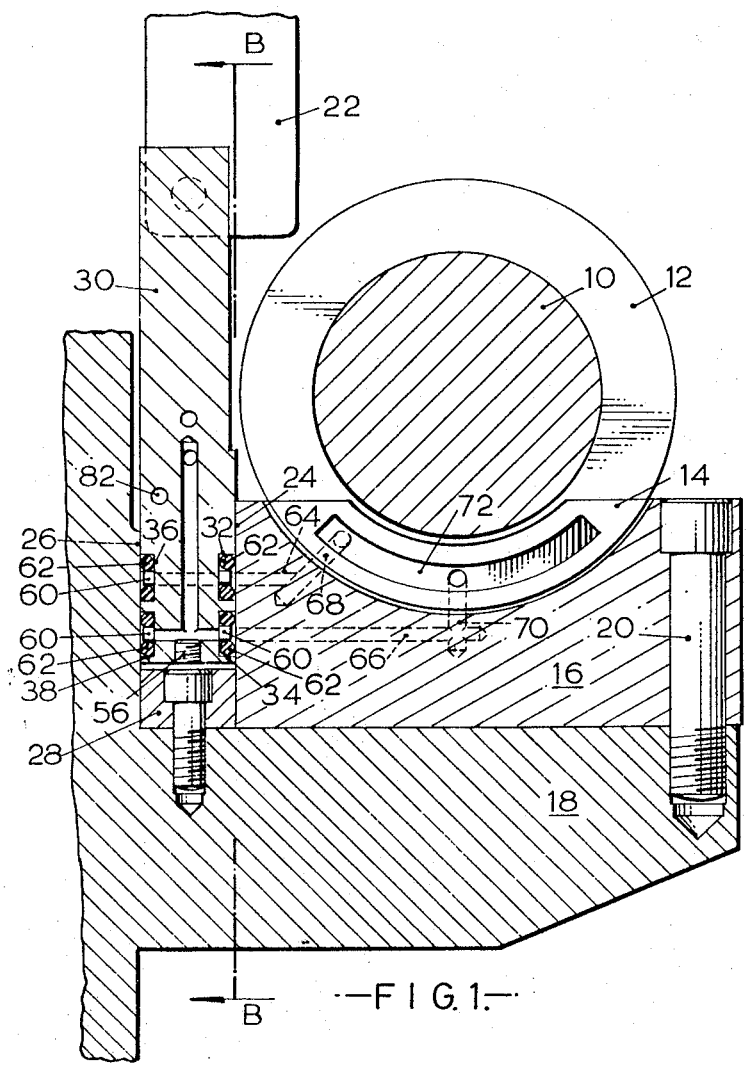

June 6, 1967 W. T. REVITT 3,323,385
HYDROSTATICALLY LUBRICATED WORM AND RACK MECHANISM
Filed Aug. 19, 1965 2 Sheets-Sheet 1

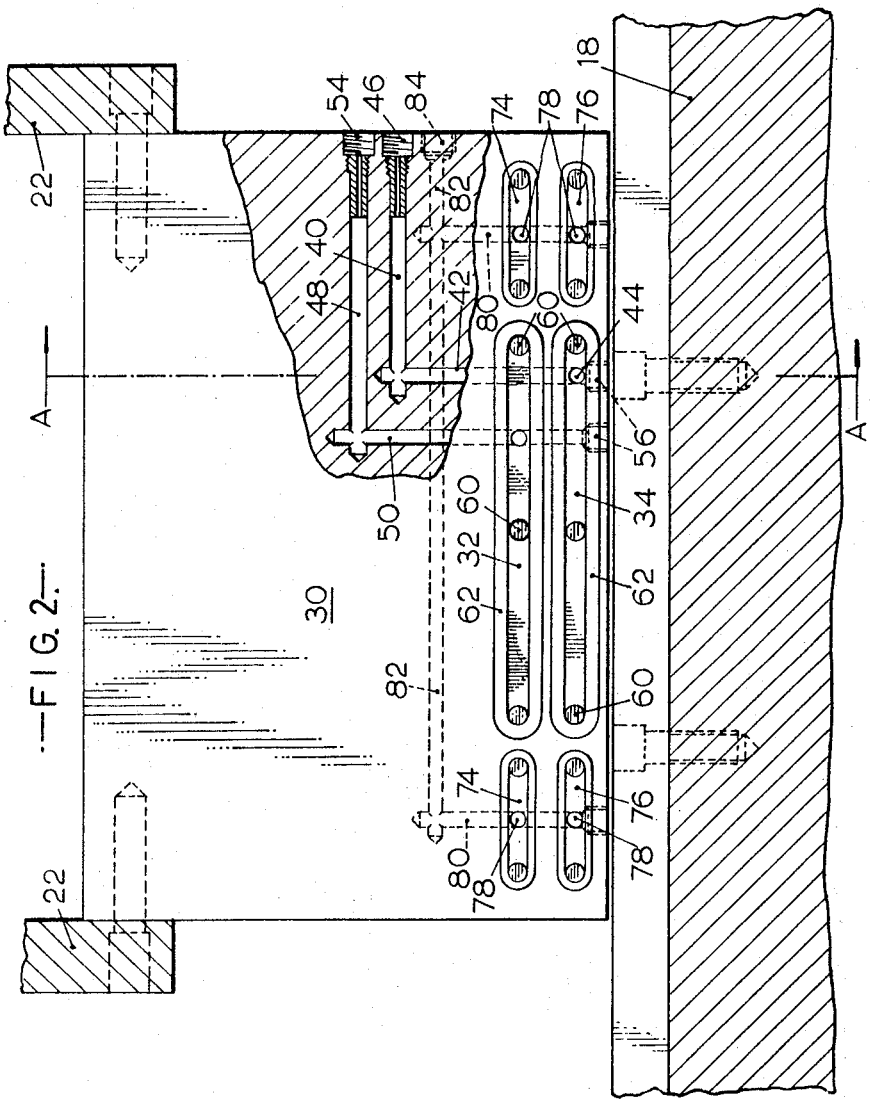

United States Patent Office 3,323,385
Patented June 6, 1967

3,323,385
HYDROSTATICALLY LUBRICATED WORM AND
RACK MECHANISM
Walter Thomas Revitt, Glenside Cottage, Saltaire Road,
Eldwick, Bingley, England
Filed Aug. 19, 1965, Ser. No. 480,859
Claims priority, application Great Britain, Aug. 22, 1964,
34,452/64
5 Claims. (Cl. 74—425)

In many machine tools a slide or table has to be traversed or fed along guides on the machine bed. The conventional method for effecting such traverse or feed is to have a nut secured to the slide or table, the nut being engaged with a screw rotatably mounted on the machine bed. An alternative arrangement is to have a rotatable worm mounted on the slide or table, and such worm engaging with a rack secured on the machine bed, the rack being arcuate in cross-section so as to partly embrace the worm. As it is very important to minimise clearance between the teeth of the worm and rack, it has been proposed to provide hydrostatic lubrication, the lubricant being supplied under pressure to the worm which has outlets on opposite side faces of the teeth or thread of the worm, a restrictor being associated with each outlet so as to ensure that the lubricant in a supply conduit or chamber is always under pressure.

By supplying lubricant under pressure to outlets on opposite sides of the worm teeth, in the arrangement just referred to, the said lubricant is forced under pressure into gaps between the teeth of the worm and the rack so as to maintain a film of oil in the said gaps when a load is applied between the worm and the rack. However, it will be appreciated that as the rack will only partially embrace the worm, lubricant will be discharged ineffectively through those outlet openings in the parts of the worm teeth that are clear of the rack.

The present invention is designed to provide an alternative method of supplying lubricant under pressure to the gaps between the worm teeth and a rack whereby ineffective discharge of lubricant will be eliminated or minimised.

According to the invention, in a worm and rack mechanism, ports in a surface of the rack body are connected by passages to outlet openings at spaced apart positions on both flanks of each rack tooth, and means are provided for supplying lubricant under pressure to those ports connected to outlets in the rack teeth engaged by the worm. For this purpose, a distributor may be adapted to be traversed along the rack so as to come into register with the ports successively as the worm traverses along the rack, and so supply lubricant under pressure to the rack teeth as they are engaged by the worm, and to discontinue the supply to each rack tooth when the worm moves out of engagement with such tooth.

One construction of a worm and rack mechanism for a machine tool, which incorporates the invention, will now be described by way of example only with reference to the accompanying drawings, in which:

FIGURE 1 is a cross-section through a worm and rack mechanism, taken on the line A—A in FIGURE 2, and FIGURE 2 is a longitudinal section on the line B—B in FIGURE 1, with part broken away to show certain passages.

Basically, the mechanism comprises a worm 10 having a worm thread 12 engaging with teeth 14 of a rack 16. The latter is secured to a fixed bed 18 of a machine tool, by bolts 20, and the worm is attached to a slide 22 which moves longitudinally of the bed. The slide 22 may be a tool or workpiece carriage, a ram, saddle or any other movable part of the machine tool.

The rear wall 24 of the rack is spaced from a vertical wall 26 of the bed 18, there being a spacer block 28 fixed in the bottom of the channel formed between the walls 24 and 26, and a distributor block 30 depending from the slide 22 is slidable endwise along the channel. The parts are so dimensioned that the block 30 is a good sliding fit within the channel, and it will be appreciated that it is traversed along the channel as the slide 22 is traversed by rotation of the worm 10.

Two large longitudinal recesses 32 and 34 are formed in the front face of the distributor block, and there are corresponding recesses 36 and 38 in the rear face. Intersecting holes 40, 42 and 44 provide a passage through the block 30 from an inlet port 46 (screwed to receive the end of a flexible lubricant supply pipe, not shown) to the recesses 34 and 38. There are similar intersecting holes 48, 50 and 52 providing a passage from an inlet port 54 to the recesses 32 and 36. The lower ends of the holes 42 and 50, are sealed by plugs 56. A restrictor 58 is fitted in each of the holes 40 and 48 near to the inlet ends for easy access. Each restrictor takes the form of a capillary tube although the design lends itself to the use of more sophisticated restrictors if desired. The purpose of the restrictors is to insure that lubricant supplied to the recesses 32, 34, 36 and 38 is under high pressure, and the lubricant supply to these recesses may be of the order of 750 pounds per square inch.

Three upstanding pegs 60 are provided in each of the four large recesses, and a flexible sealing ring 62 is stretched around these pegs to provide a seal to prevent escape of lubricant from the recesses.

Along the length of the rack 16, there are two series of holes 64 and 66, one pair of holes for each tooth of the rack, the positioning of these holes being such that their rear ends register with the lubricant filled recesses 32 and 34 respectively, as seen in FIGURE 1. Inclined holes 68 and 70 formed in the rack lead respectively from arcuate recesses 72 in the opposed flanks of the teeth of the rack to the holes 64 and 66. Thus there are provided passages in the rack whereby these teeth which have their corresponding holes 64 and 66 registering with the recesses 32 and 34, are supplied with lubricant under high pressure to the arcuate recesses 72 in their flanks. The recesses 32 and 34 are so disposed that only those teeth of the rack which are in engagement with the worm thread 12 are supplied with the high pressure lubricant. This arrangement provides hydrostatic lubrication for the worm and rack mechanism.

The recesses 36 and 38 contain lubricant under substantially the same pressure as that in the recesses 32 and 34, so that the distributor block is hydraulically balanced to avoid undue friction and wear between the rear face of the block and the wall 26 of the bed. As an alternative to the balancing arrangement described above, there may be a hydrostatic bearing on the rear face of the block fed from a separate lubricant supply through a separate restriction.

The distributor block 30 is extended beyond each end of the two recesses 32 and 34, and a pair of secondary or low pressure recesses 74 and 76 are formed in the block front face of each extension, the lower pressure recesses being also aligned with the holes 64 and 66 in the rack. These low pressure recesses are connected by passages (formed by holes 78, 80 and 82) with an inlet port 84 for a source of lubricant under lower pressure than the first mentioned or high pressure lubricant source, and they are so disposed that they will register with those rack ports connected to outlet openings 72 in teeth that are about to be engaged or have just been disengaged by the worm. With this arrangement, lubricant at relatively low pressure will be fed to those rack teeth immediately ahead of and rearwardly of the worm irrespective of the direction of traverse. The low pressure lubricant fed to the rack teeth about to be engaged by the worm will ensure that the surfaces of those teeth will be adequately lubricated as the worm enters into engagement with them and just prior to high pressure lubricant being fed to them.

I claim:
1. Worm and rack mechanism comprising a toothed rack, a worm having a thread engaging some of the teeth of said rack, said rack teeth defining lubricant outlet recesses in the flanks of said teeth, and said rack further defining passages leading from said outlet recesses to ports in a wall of said rack, a distributor movable with said worm along said rack said distributor providing means for connecting a source of high pressure lubricant to said ports.

2. Worm and rack mechanism comprising a toothed rack, a worm having a thread engaging some of the teeth of said rack, said rack teeth defining lubricant outlet recesses in the flanks of said teeth, and said rack further defining passages leading from said outlet recesses to ports in a wall of said rack, a distributor movable with said worm along said rack, said distributor defining supply recesses registrable with said ports in said rack, and further defining outlet ports for receiving a high pressure lubricant supply and passages between said inlet port and said supply recesses.

3. Worm and rack mechanism according to claim 2, wherein said supply recesses in said distributor are of such a length that lubricant is only supplied through them to those teeth of said rack which are in engagement with said worm.

4. Worm and rack mechanism according to claim 3, wherein said distributor further defines small recesses one at each end of said supply recesses, an inlet port for low pressure lubricant, and passages between said low pressure inlet port and each of said small recesses.

5. Worm and rack mechanism according to claim 2, wherein said distributor further defines small recesses one at each end of said supply recesses, an inlet port for low pressure lubricant, and passages between said low pressure inlet port and each of said small recesses.

References Cited
UNITED STATES PATENTS

| | | | |
|---|---|---|---|
| 1,502,083 | 7/1924 | Zoelly | 74—468 |
| 2,641,139 | 6/1953 | Beisner | 73—425 |
| 2,821,865 | 2/1958 | Ufert | 74—468 X |

DONLEY J. STOCKING, *Primary Examiner.*

L. H. GERIN, *Assistant Examiner.*